No. 731,070. Patented June 16, 1903.

UNITED STATES PATENT OFFICE.

EDGAR F. PRICE, OF NIAGARA FALLS, NEW YORK, ASSIGNOR TO UNION CARBIDE COMPANY, OF NIAGARA FALLS, NEW YORK, A CORPORATION OF VIRGINIA.

PROCESS OF PREPARING CARBID OF CALCIUM.

SPECIFICATION forming part of Letters Patent No. 731,070, dated June 16, 1903.

Application filed April 13, 1901. Serial No. 55,667. (No specimens.)

*To all whom it may concern:*

Be it known that I, EDGAR F. PRICE, a citizen of the United States, residing at Niagara Falls, in the county of Niagara and State of New York, have invented certain new and useful Improvements in Preparation of Carbid of Calcium, of which the following is a specification.

Carbid of calcium when very finely subdivided is not desirable, and such finely-divided calcium carbid results from screening, breaking, and otherwise preparing pigs of calcium carbid.

Objects of the present invention are to provide for getting such finely-divided, as well as comparatively coarsely-divided, calcium carbid into pieces of marketable size; and, stated in general terms, the invention comprises the method which consists in mixing pulverized or granulated carbid of calcium with powdered or comminuted bituminous coal and then subjecting the mixture to a high temperature in a retort, so as to drive off the volatile gases and make the mass coherent.

In practicing the invention pulverized or granulated carbid of calcium is mixed with pulverized or broken bituminous coal. From five to twenty-five per cent., more or less, by weight, of pulverized bituminous coal is used, according to the size of the pieces of carbid of calcium. The finely-divided calcium carbid requires less of the divided bituminous coal than does the coarser calcium carbid. The comminuted or pulverized bituminous coal and carbid of calcium are stirred together to dry, and the mass is then retorted, with the result that hydrocarbon and other volatile matter is driven off, and the bituminous coal is converted into coke, which holds the carbid of calcium and forms a hard solid substance. For this purpose the mass may be placed in and subjected to the action of a heated retort, similar to those used in making coal-gas, and provided with an offtake, through which the volatile matter can be driven off. The product of the retort is a hard mass consisting of calcium carbid and coke, the latter serving to bind the mass into a homogeneous body capable when moistened of yielding acetylene of practically the same qualities as that generated from a large lump of carbid, because the coke simply remains with the lime, and therefore the carbid generates acetylene, which is not in any way affected or adulterated by the bituminous coke, which gives off practically no gas under the described treatment. These masses, which are the product of the retorts, may be crushed to commercial sizes for use in generators in the usual way.

It will be obvious to those skilled in the art to which the invention appertains that modifications may be made in details without departing from the spirit thereof; but,

Having thus described the nature and objects of the invention, what I claim as new, and desire to secure by Letters Patent, is—

The herein-described process which consists in mixing comminuted or granulated calcium carbid and comminuted or powdered bituminous coal, retorting the mass to drive off volatile matter and convert the bituminous coal into bituminous coke and produce the coherent mass or body, and then crushing the body or mass into pieces of commercial size, substantially as described.

In testimony whereof I have hereunto signed my name in the presence of two witnesses.

EDGAR F. PRICE.

Witnesses:
GEO. H. DANFORTH,
F. E. LAWTON.